(12) United States Patent
Kim et al.

(10) Patent No.: US 11,816,640 B2
(45) Date of Patent: *Nov. 14, 2023

(54) ELECTRONIC EVENT FACILITATING SYSTEMS AND METHODS

(71) Applicant: Next Jump, Inc., New York, NY (US)

(72) Inventors: Yong-Chul Charles Kim, New York, NY (US); Meghan Messenger, New York, NY (US); Greg Kunkel, New York, NY (US); Thomas Fuller, New York, NY (US)

(73) Assignee: Next Jump, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/153,849

(22) Filed: Jan. 12, 2023

(65) Prior Publication Data

US 2023/0169470 A1 Jun. 1, 2023

Related U.S. Application Data

(63) Continuation of application No. 16/839,075, filed on Apr. 2, 2020, now Pat. No. 11,556,900.

(60) Provisional application No. 62/830,329, filed on Apr. 5, 2019.

(51) Int. Cl.
*H04L 12/18* (2006.01)
*G06Q 10/10* (2023.01)
*G06Q 10/1093* (2023.01)
*G06Q 10/105* (2023.01)

(52) U.S. Cl.
CPC ....... *G06Q 10/1095* (2013.01); *G06Q 10/105* (2013.01); *H04L 12/18* (2013.01); *H04L 12/1818* (2013.01); *H04L 12/1831* (2013.01); *H04L 12/1836* (2013.01)

(58) Field of Classification Search
CPC .............. G06Q 10/1095; G06Q 10/105; H04L 12/1818; H04L 12/1831; H04L 12/1836
See application file for complete search history.

(56) References Cited

U.S. PATENT DOCUMENTS

| | | | | |
|---|---|---|---|---|
| 7,240,287 B2* | 7/2007 | Qureshi | ................ | G06F 3/0481 715/730 |
| 8,670,018 B2* | 3/2014 | Cunnington | ............. | H04N 7/15 715/701 |
| 8,949,899 B2 | 2/2015 | Errico et al. | | |

(Continued)

*Primary Examiner* — Nazia Naoreen
(74) *Attorney, Agent, or Firm* — Fox Rothschild LLP

(57) ABSTRACT

Systems and methods for operating an event with an online conferencing component. The methods comprise: receiving, by a feedback processing system, a user input selecting an event from a plurality of scheduled events which each have an online conferencing component provided by a web conferencing service; enabling, by the feedback processing system, an electronic feedback message composing function and a numerical rating selection function for a duration of time determined based on a duration setting of a timer; performing, by the feedback processing system, the electronic feedback message composing function to compose an electronic feedback message for an individual associated with the selected event; and performing, by the feedback processing system, the numerical rating selection function to select a numerical rating for the individual associated with the selected event.

20 Claims, 19 Drawing Sheets

(56) References Cited

U.S. PATENT DOCUMENTS

| | | | |
|---|---|---|---|
| 8,997,134 B2 * | 3/2015 | Smith | H04N 21/4758 |
| | | | 725/24 |
| 9,137,376 B1 | 9/2015 | Basart et al. | |
| 9,154,531 B2 * | 10/2015 | Kashi | H04L 65/4038 |
| 9,264,245 B2 * | 2/2016 | Pasquero | G06Q 10/10 |
| 9,575,616 B2 | 2/2017 | Linton | |
| 10,013,890 B2 * | 7/2018 | Allen | G06F 40/30 |
| 10,110,645 B2 | 10/2018 | Bader-Natal et al. | |
| 10,120,547 B2 | 11/2018 | Adarraga | |
| 10,268,772 B2 | 4/2019 | Deopura | |
| 10,666,696 B2 | 5/2020 | Bader-Natal et al. | |
| 2009/0052645 A1 * | 2/2009 | Bansal | H04L 12/1827 |
| | | | 379/202.01 |
| 2009/0263777 A1 | 10/2009 | Kohn | |
| 2009/0291426 A1 | 11/2009 | Polivka | |
| 2013/0204664 A1 | 8/2013 | Romagnolo et al. | |
| 2014/0279625 A1 | 9/2014 | Carter | |
| 2014/0289754 A1 | 9/2014 | Riethmueller | |
| 2015/0070585 A1 | 3/2015 | Sharif-Ahmadi et al. | |
| 2016/0048583 A1 | 2/2016 | Ontko | |
| 2016/0260044 A1 | 9/2016 | Sabet et al. | |
| 2017/0206611 A1 | 7/2017 | Morgia et al. | |
| 2017/0332150 A1 | 11/2017 | Kehler et al. | |
| 2018/0007150 A1 | 1/2018 | Deopura | |
| 2018/0137425 A1 | 5/2018 | D'Alo' et al. | |
| 2018/0375676 A1 | 12/2018 | Bader-Natal et al. | |
| 2019/0088153 A1 | 3/2019 | Bader-Natal et al. | |
| 2020/0026536 A1 | 1/2020 | Li et al. | |

* cited by examiner

STEP 5: Judge Rating
Advanced feature: using the master app to enter the
judge score so it shows up on this screen. The app will also
speak out the ratings. These screens will automatically flow.

STEP 6: Judge gives feedback
The timer works the same as the one for presentation
Press START button to start the timer
The judge timer is set to be default at 2 minutes
Press PAUSE button to pause at any time
The flow will not continue until the DONE button is pressed Event ABC debriefing screen Step 3: Audience Feedback Mobile App: Admin View Desktop App: Audience View After the presentation is over, the in-app voice will announce the meeting tag to be used and have a 2min countdown when audience can give the feedback.

Step 5: Judge Verbal Feedback

Mobile App: Admin View

Desktop App: Audience View

The judges have a 2min countdown to give their verbal feedback.

ELECTRONIC EVENT FACILITATING SYSTEMS AND METHODS

CROSS-REFERENCE TO RELATED APPLICATION(S)

This application is a Continuation of U.S. patent application Ser. No. 16/839,075 which was filed on Apr. 2, 2020 and claims the benefit of U.S. Provisional Application No. 62/830,329, filed Apr. 5, 2019. The contents of these Applications are incorporated herein by reference in their entirety.

FIELD OF THE INVENTION

The present invention is generally related to the field of human resources technology including event facilitating systems and methods and cognitive development of employees.

BACKGROUND OF THE INVENTION

Human resources technology is a rapidly growing field supported by growing recognition that a company requires better tools for supporting a company's overall growth and competitiveness. A significant amount of time and resources have been directed in the industry to developing interactive tools, systems, software or other computer-implemented resources that improve human resources related functions and operations. Various challenges can exist related, for example, to effectiveness, value provided, ease of use, adoption, objectiveness, and technical implementation. One component of human resources technology is directed to the development of employees' cognitive skills such as their ability to make decisions or develop good judgment. Known systems have been focusing very little on such development.

Moreover, organizations such as corporations, nonprofits, and governments typically exhibit a distinct corporate or organizational culture. Aspects of corporate culture include corporate norms, values, and behaviors of employees. Negative corporate culture or negative aspects of corporate culture may cause increased employee turnover, reduced employee productivity, or reduced employee engagement. Current systems do not appear to provide exercises through which employees can be trained so that the chance of an organization exhibiting negative corporate culture or the negative aspects in the existing culture can be reduced. Additionally, the training systems may not be tailored to different cultures (e.g., those that the culture seeks as good behaviors).

HR departments and other managements at many organizations may also attempt to improve aspects of corporate culture. However, attempts at improving culture by organizations may be based on intuition or anecdotal data. There are computing systems that may allow a human resources department to generate surveys that may be completed by employees. These surveys, however, are merely used to gather responses to the questions being asked and are directed to organizational performance measurement. They either do not improve employees' cognitive skill or provide minimal feedback giving training to employees, even if they do.

Organizations may also use internal feedback mechanisms. Some existing feedback mechanisms allow employees to select limited, predetermined words, phrases, and sentences and delay the messages for a period of time. Without the ability to permit the feedback giver to construct his original and genuine message, using such mechanisms to improve feedback giving skill is also inadequate, as the message to be composed is restricted or controlled in some ways. Some existing feedback mechanisms involve a feedback supervisor who is assigned to accept or reject feedback before it is sent to the intended individual. The feedback supervisor may reject or delete a message he determines to be inappropriate such that the message is never sent to the individual. These messages, however, do not receive consecutive feedback from others and the feedback giver may not know why the message was returned or deleted (e.g., inappropriate but do not know exactly why the message is inappropriate when the message is the sender's genuine message). Absence of such feedback is also a lack of the guidance that the sender might need in order to compose effective messages in the future. Approval of the message also depends on one person's opinion and it is unclear whether that person's opinion is accurate. Other feedback supervisors might disagree and approve the message instead. The sender is also unaware of how his opinion is compared to other senders who might have similar opinions that accurately describe the situation. Approval by the feedback supervisor also inserts a delay between the moment the feedback giver sends the message and the moment the feedback recipient receives the message.

Most importantly, none of the aforementioned feedback mechanisms and systems provide a tool or exercises that can help feedback givers and recipients to develop cognitive skills. There are no systems that build this training tool into the exercise of giving feedback to others. There are also no technologies that can integrate this type of training into the feedback system or a user interface of the feedback system satisfactorily.

Accordingly, there remains a need for HR technology related to systems for administering meetings that involve feedback systems and that are directed to provide exercises through which a person's feedback giving skill can be improved.

SUMMARY OF THE INVENTION

In accordance with principles of the invention, a system for facilitating events is contemplated. The system comprises a first electronic device implementing a first event software application. The first event software application configures the first electronic device to create events and execute events. The created event includes a plurality of stages and the plurality of stages include a first stage (e.g., presentation) that has a time duration, a second stage (e.g., participants formulating and issuing feedback) that has a time duration, and third stages (e.g., judge giving numerical rating and verbal feedback) that each has a time duration. The first electronic device configured by the first event software application allows user to create an event by inputting the time duration of the first stage (e.g., presentation time such as 3, 5, 7, or 10 minutes) and select individuals to be associated with the first stage and individuals to be associated with the third stages. The time durations of the second and third stages are predetermined by the first event software application. The first electronic device configured by the first event software application further generates a meeting tag of the event in response to the creation of the event.

The first event software application further configures the first electronic device to implement: (a) a timer configured to operate and to be displayed with the plurality of stages; (b) a plurality of commands configured to control progress of the event; and (c) a user interface configured to receive feedback information (e.g., numerical ratings from the judges).

The first event software application further configures the first electronic device to execute the event (or the plurality of stages in the event) in a sequence and the plurality of commands include commands configured to initiate and pause the timer displayed with the plurality of stages upon user selection and a command configured to advance from one stage in the plurality of stages to another stage in the plurality of stages upon user selection.

The system also comprises a second electronic device implementing a second event software application that configures the second electronic device to communicate with the first electronic device and present execution of the event and operation of the timer to individuals in real time on a monitor based on the communication (or based on the meeting tag accessed through the communication). The advancement from the one stage to the other stage and the operation of the timer being presented to the individuals on the monitor by the second electronic device depend on user selection of the corresponding command on the first electronic device.

The system further comprises a mobile device implementing a feedback software application that configures the mobile device to allow the feedback giver to formulate and transmit feedback to other devices and identify the event using the meeting tag. The second stage is configured to display the meeting tag. The second stage allows the feedback giver to formulate and transmit feedback for the identified event from the mobile device. The identified event on the mobile device is selectable by the feedback giver to formulate and transmit feedback for the identified event. The timer is further configured to operate and to be displayed with the second stage, and the commands are further configured to initiate and pause the timer displayed with the second stage.

The system is configured to generate feedback results after the first electronic device finishes executing the event. The feedback results are based on the feedback information received from the first electronic device, feedback received from the mobile device by the feedback giver during the third stage, and the selected individuals associated with the first and second stages.

Counterpart method and computer-readable medium embodiments would be understood from the above and the overall disclosure. Methods, processes, procedures, and steps described in this application are protocols, algorithms, or computer instructions readable by a processor and stored on the non-transient computer readable medium. Such medium may be permanent or semi-permanent memory such as hard drive, floppy drive, optical disk, flash memory, ROM, EPROM, EEPROM, etc., as would be known to those of ordinary skill in the art. Also, broader, narrower, or different combinations of the described features are contemplated, such that, for example, features can be removed or added in a broadening or narrowing way.

BRIEF DESCRIPTION OF THE DRAWINGS

Various features of examples in accordance with the principles described herein may be more readily understood with reference to the following detailed description taken in conjunction with the accompanying drawings, where like reference numerals designate like structural elements, and in which.

DETAILED DESCRIPTION OF THE INVENTION

Figure 1:
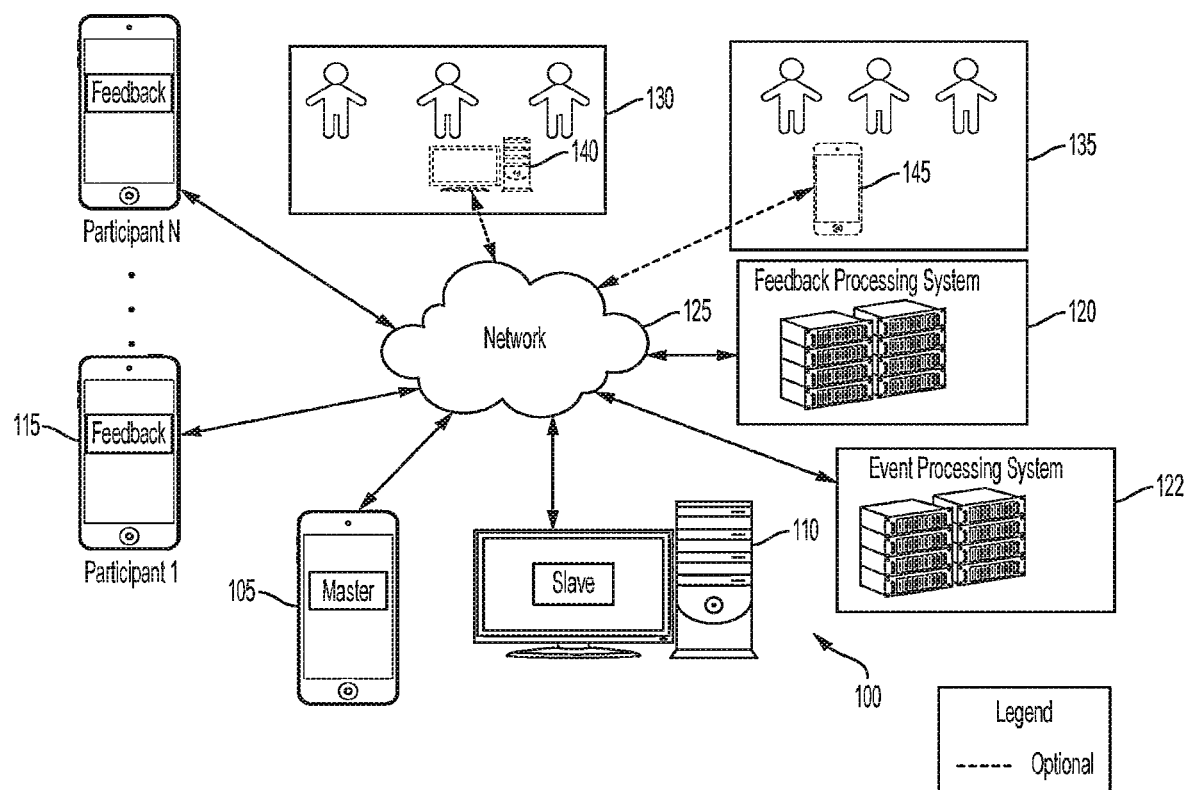
FIG. 1 illustrates one embodiment of the system for developing cognitive skills of individuals in accordance with some embodiments of the present invention.

Embodiments of the present invention are directed to a system for developing a person's cognitive skills. In one embodiment, the system is directed to developing a person's feedback giving skills. The system executes or provides a procedure through which participants (e.g., audience, audience participants, or feedback givers) follow to formulate and issue feedback to other individuals (e.g., feedback recipients). Feedback is given through a feedback app. The system also involves participation of feedback recipients and judges, in addition to participants. Judges are people who have more experience in giving accurate, constructive feedback than the participants, who have already developed such skills, who have a higher standard for giving feedback (e.g., positive or negative feedback) than the participants, or who are feedback giving experts. The procedure involves each feedback recipient giving a presentation or performing other activities (presenters) in a period of time and each judge providing verbal feedback to each presentation. The feedback given by a judge may be referred to as a reference feedback to which participant's feedback can be compared. The procedure is performed by executing an "event" or "meeting" which can be created from an event app or event apps provided by the system. The event app(s) also executes the created event, and completion of the event or procedure allows the system to provide feedback results to the participants, feedback recipients, judges, and other individuals based on information received during the event (information received, for example, includes event information, participants' feedback, and judges' feedback). The flow of the procedure is also controllable from the event app.

The system processes receive information in a manner to isolate, anonymize, and secure feedback giver identity information (except judge's identity information). The system is also configured to assure that only the people within an enterprise can use the system, event apps, and feedback app, such as providing an authentication system through the individuals need to login with their credentials. Details of these anonymization and authentication processes are described in application No. 62/807,693, the entirety of which is incorporated by reference. A copy of application No. 62/807,693 is also attached with this application. As a result, the feedback results are presented on a display or to audience without revealing feedback givers' identities (e.g., feedback givers' identities cannot be shown on the display or are not available to the event software application because the particular way the system operates, except judges' identities) and yet are still able to convey meaningful information that each feedback giver can view and use to determine how his feedback or rating is compared to other participants and the judges. The conveyed information is an integration of received information and serves a guide or benchmark to each participant for formulating future feedback for presentations that involve similar presentation characteristics (e.g., styles, techniques, tones, flaws, strengths, or a combination thereof).

The event apps, in conjunction with the feedback app, can be used to train and improve participants' feedback giving skills and is indirectly developing cognitive skills. The event apps and the feedback app can be provided as tools for employees of an enterprise to develop their feedback giving skills anonymously (e.g., participants are employees). The system for developing a person's cognitive skills is designed to accelerate learning, in particular to accelerate learning how to give feedback to peers by entering feedback and learning from judges' feedback. The system anonymizes feedback giver's identities and is configured to protect external input or login. Only employees of the company are allowed to use the event apps and feedback app. Variations of this approach are contemplated.

FIG. 1 illustrates one embodiment of the system 100 for developing cognitive skills of individuals. The system 100 includes a first electronic device 105 implementing a first or master event software application, a second electronic device 110 implementing a second or slave event software application, one or more participant electronic devices (or third electronic devices) 115 implementing a feedback software application, a feedback processing system 120, and an event processing system 122.

The devices 105, 110, 115 can transmit and receive data over a communications network 125 such as the internet and they include the necessary hardware and software that supports communications over the network.

Operation of the system 100 involves participation of a group of individuals who are scheduled to give presentations or perform other activities (presenters or feedback recipients) 130, a group of individuals who are provided an opportunity to write feedback (audience or feedback givers), and a group of individuals who are responsible for giving reference feedback or spoken feedback (judges) 135. Each of the presenters 130 and judges 135 may access an electronic device 140, 145 that can access an online meeting, web conferencing, or videoconferencing software application such as WebEx so their activities (video and audio) can be transmitted to other electronic devices 105, 110, 115 and individuals. Presenters 130 and judges 135 may or may not be in the same location or room. Electronic devices 105, 110, 115 also have access to similar conferencing software applications so they can receive their transmission and interact with the presenters and judges if necessary. Electronic devices 140, 145 can also communicate with other electronic devices over the network 125. In some embodiments, the presenters 130 and judges 135 may not need access to an electronic device or WebEx to transmit their activities. For example, electronic devices are not necessary when the presenters 130, judges 135, participants 115, and users of the first electronic device 105 and second electronic device 110 are in the same location or room where the judges 135, the participants, and users can watch and hear the activities in person. The presenters 130 and judges 135, or their electronic devices 140, 145, may not need to communicate over the network 125.

The feedback software application provides a user interface that allows an individual or participant to compose and send a freestyle feedback message (i.e., participant can type any words he wishes and send his original message, the message is not filtered, approved, or delayed) over the network 125. Participants may also be referred to as audience, audience participants, or feedback givers. Participants may or may not be in the same location as the presenters and/or judges. Participants may follow the progress of the event or watch the event in person or through the slave application (or the screens displayed by the slave application). The participant electronic devices 115 with the feedback software application are implemented using the employees' personal phones or handheld devices that have the feedback software application installed on them. As such, each participant has a mobile phone that has the feedback app or ability to use the feedback software application on it. Each of the participant electronic devices 115 with the feedback software application implemented is considered as a device that is part of the feedback processing system 120. The feedback processing system 120 is configured to receive feedback messages and process them to anonymize and secure participants' identities. The feedback software application can be used every day by the employees and is available and functional outside of the master and slave applications and the created events for the everyday service of providing feedback to others in the group or company. The feedback processing system 120 is also configured to receive data from the first electronic device 105 and the participant electronic devices 115, process the received data, and produce feedback results based on the processed data. The feedback software application and the feedback processing system 120, for example, can be those described in application No. 62/807,693, the entirety of which is incorporated by reference.

The event processing system 122, in some embodiments, is a server-implemented system (e.g., cloud-based system) that functions to provide the features and services in conjunction with a master event software application and a slave event software application.

Although FIG. 1 shows only one first electronic device 105, the system 100 can include additional first electronic devices 105 with each implementing a master event software application. The same also applies to the second electronic device 110. The system 100 can include additional second electronic devices 110 with each implementing a slave event software application. The combination of the first electronic device(s) 105 and the second electronic device(s) 110 are referred to as the event facilitating system, or the event facilitating software application. The first electronic device with the master event software application installed may be referred to as the master event facilitating device. The second electronic device with the slave event software application installed may be referred to as the slave event facilitating device. The participant electronic device with the feedback software application installed may be referred to as the feedback submission device. It is understood that descriptions of the master event software application, slave event software application, and the feedback software application are equally applicable to the electronic devices on which they are implemented (e.g., description of the operation of the master event software application is applicable to the operation of the first electronic device).

Figure 2:
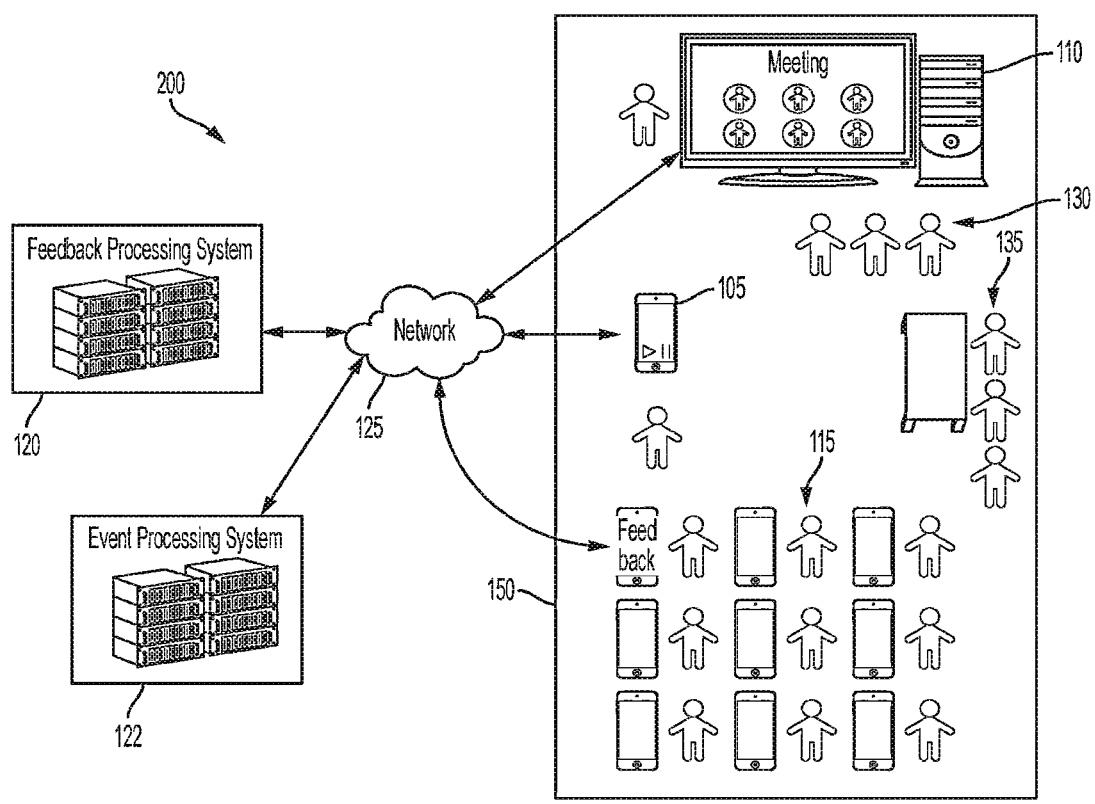
FIG. 2 illustrates another embodiment of the system, or another implementation of the system, for developing cognitive skills of individuals in accordance with some embodiments of the present invention.

FIG. 2 illustrates another embodiment of the system 200, or another implementation 200 of the system, for developing cognitive skills of individuals. Implementation 200 shows that the master event facilitating device 105, the slave event facilitating device 110, the feedback submission device 115 and their users, the presenters 130, and the judges are all in the same location or room 150. Device 105, device 110, device 115, the feedback processing system 120, and the event processing system 122 communicate with each other over the network 125. Although only one feedback submission device 115 is shown being connected to the network 125, and although the devices and people are shown in the same location, it is understood these devices and people can be in different locations and communicate over the network 125 in the manner depicted in FIG. 1.

Figure 3:
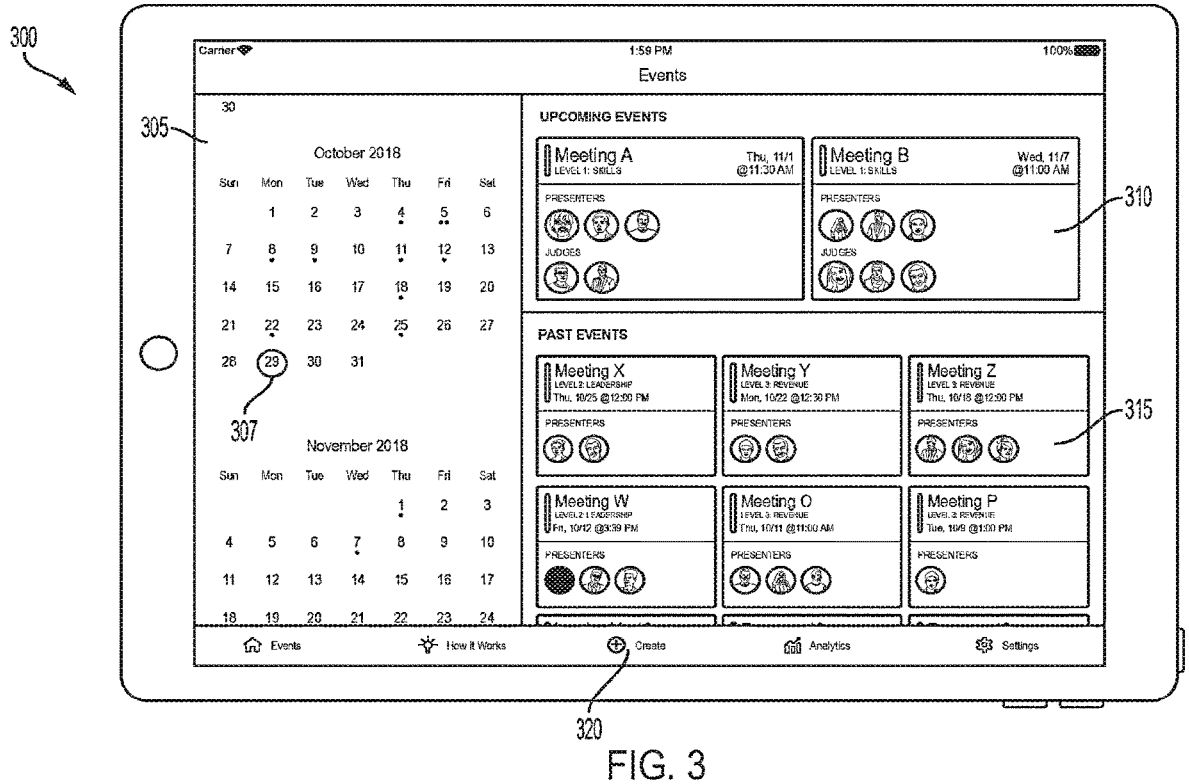
FIG. 3 illustrates a first screen or the main screen of the master event software application in accordance with some embodiments of the present invention.
Figure 4:
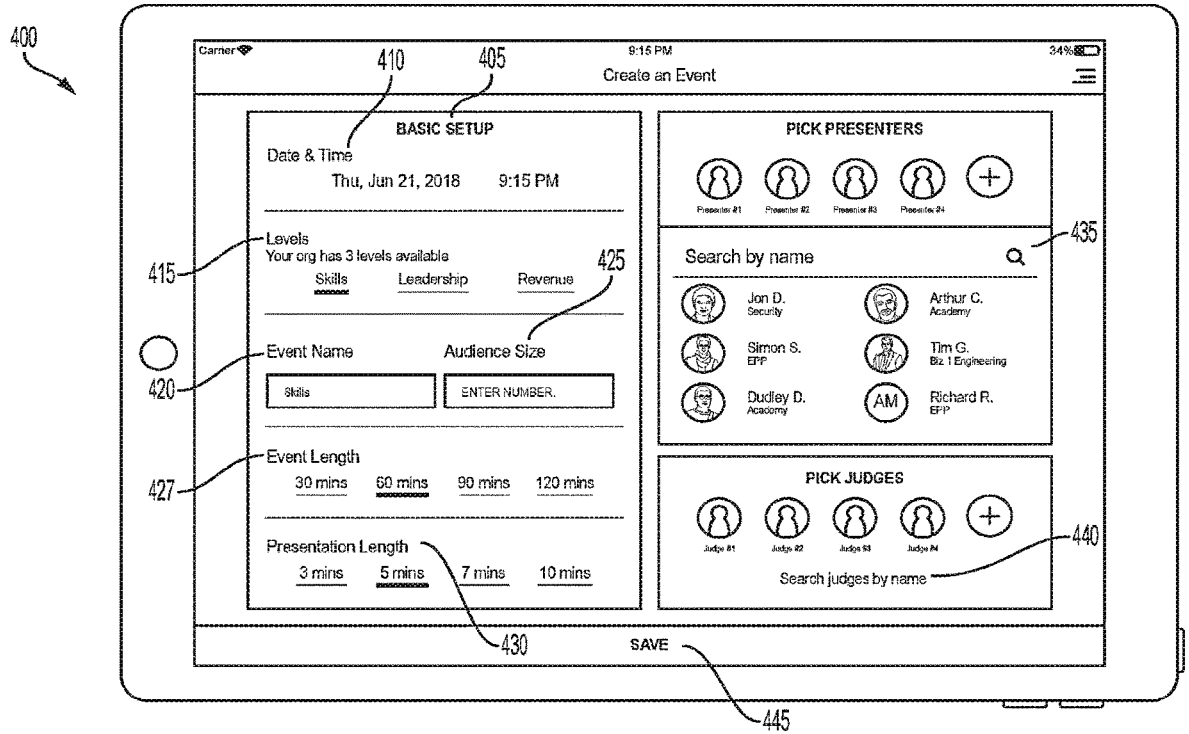
FIG. 4 illustrates a second screen or an event creation screen of the master event software application in accordance with some embodiments of the present invention.
Figure 5:
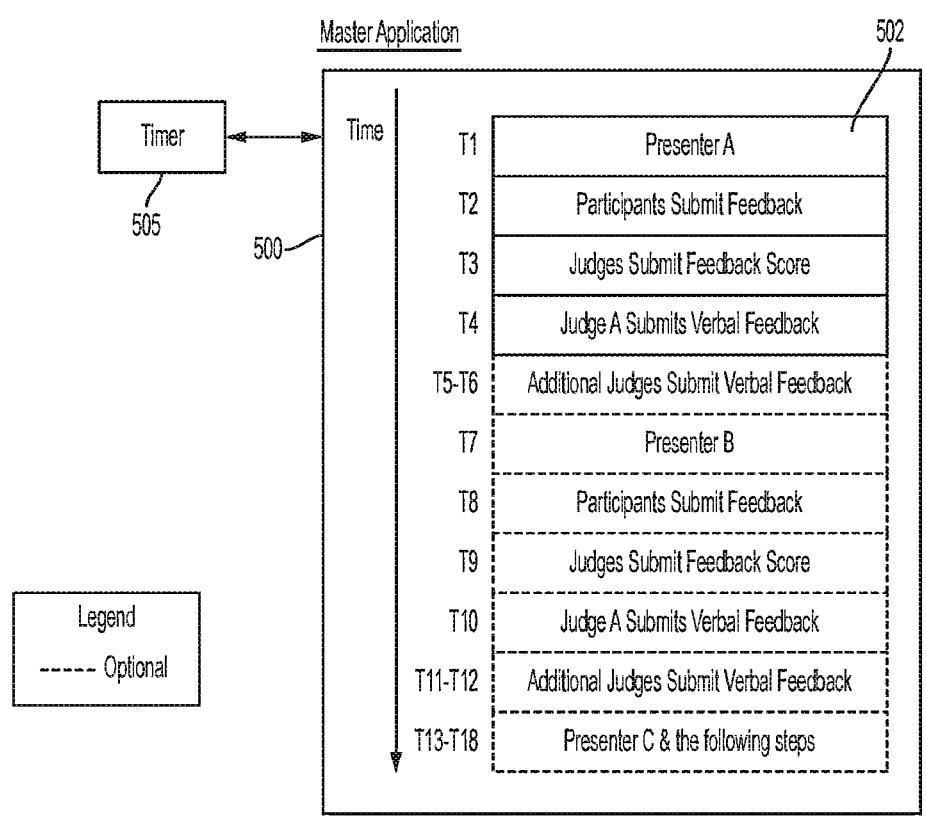
FIG. 5 illustrates a default algorithm and a timer of the master event software application in accordance with some embodiments of the present invention.

Description will now be directed to the master event software application (the master application). FIGS. 3-5 illustrate part of the user interface of the master application and operations of the master application.

FIG. 3 illustrates a first screen or the main screen 300 of the master application. The main screen 300 includes a calendar 305 with dates that are selectable by the user of the master application to view events scheduled for that date (each date is a date command 307 or button selectable by the user). The main screen 300 also includes a section 310 displaying upcoming events and a section 315 displaying past events. The main screen 300 further includes an event creation command 320 that is configured to present an event creation screen upon selection.

FIG. 4 illustrates a second screen or an event creation screen 400 of the master application. The event creation screen 400 includes a setup section 405 having a plurality of commands that allow the user to input information about the event that is about to be created. The commands, for example, include a date and time command 410 that allows the user to enter the date and time of the event, an event type command 415 that allows the user to select the type of the event (e.g., presentation on skill-related topics, presentation on leadership-related topics, presentation on revenue-related topics), an event name command 420 that allows the user to type the name of the event, an audience size command 425 that allows the user to select an audience size (e.g., between 50-100 people) or a particular group within the enterprise (e.g., marketing department and the employees in that department), an event length command 427 that allows the user to pick the anticipated length of the event, and a sub-event length command 430 that allows the user to choose the anticipated length of the sub-event (e.g., a presentation). For example, an event may be 60 minutes long and include three sub-events with each being 5 minutes long.

The event creation screen 400 also includes a presenter selection command 435 or a feedback recipient selection command. The master application may include a database storing identities of all the employees within the enterprise. In some embodiments, the database may be a human resources database of the enterprise and the master application is configured to communicate with that database to obtain the names of all the employees. The presenter selection command 435 allows the user to select presenters or feedback recipients from a list of employees obtained from the database. The selected presenters are individuals who would be giving presentations or performing other activities at the event to be created, with each presenter scheduled to present or perform in a sub-event.

The event creation screen 400 further includes a judge selection command 440 that allows the user to select certain people to be the judges. The master application may include another database storing identities of all the available judges. This database may also be located in another location and the master application may be configured to communicate with that database over the network to obtain the names of all the available judges.

The event creation screen 400 includes a command 440 (e.g., save command) to create an event based on the information input in the aforementioned commands after the user selects the command 440. After the event is saved or created, the created event may be displayed in the upcoming events section 110 (FIG. 1) if the current date is close to the date of the created event and be associated with the calendar 105 (FIG. 1) based on the date of the created event. The user can access the created event from the upcoming events section 110 or the calendar by selecting the date of the created event. Upon selection, the master application displays the event creation screen with previously entered information. The user can then edit the event by changing the date, time, length, or other information of the event or sub-event, by removing a selected presenter or judge from the event, by adding another presenter or judge to the event, or by changing a combination thereof. The event is updated after the user selects the command 440. Creation of the event also generates an event tag (or meeting tag) that is used by the feedback submission device to collect feedback and other data (or making the event selectable from the feedback submission and issue feedback to the event), and by the feedback processing system to aggregate or integrate data received from the feedback submission device and the master application. For example, the event tag may be a file that includes the name or an identifier of the event, the date and time information of the event, the event type information, the length information of the event, identity information of the selected presenters, and identity information of the selected judges. In some embodiments, the event tag may have only the name or an identifier of the event that can be used by other application, systems, or devices to perform operations for that event. The other information can be separated, stored, and accessed by using the event tag. The created event (event information or information entered in the event creation screen 400 and event tag) is transmitted to the feedback processing system and the feedback submission device over the network.

After the user creates an event, the information is stored on the master application or an event processing system (discussed later). The feedback application can request and/or poll the service of the master application or event processing system for upcoming events and can store information about upcoming events in the feedback application. The feedback application can be configured to determine when an event is coming up to remind the user of the feedback application. The feedback application also creates a tag in response to the received information about the upcoming event and configured the feedback display screens to allow the user to select the event and in response, the feedback application automatically inputs information about the event in into the feedback entry as necessary.

The master application includes a default algorithm or data structure that can be modified according to the information the user entered in the event creation screen. FIG. 5 illustrates one embodiment of the default algorithm or data structure 500 (before user modification). The length of each time duration (e.g., T1, T2, T3, etc.) and the number of duration slots 502 can be determined from the event creation screen. The duration slots with phantom lines are used show that those slots are optional and will depend how many presenters and judges are selected. To create an event, the user selects at least one presenter and one judge (enhance T1-T4 are in solid lines). The algorithm or data structure 500 is used to run or execute the event. In other words, the master application provides a basic event format and rules (the default algorithm) for feedback giving skill learning and is configured for the user of the master application to just simply change minor variables such as time duration and add individuals. The format and rules make sure that the event runs smoothly and on time.

Other arrangements of the default algorithm or data structure 500 are also contemplated. For example, a judge's verbal feedback can be given before the judge gives a feedback score. For another example, judge A can give a feedback score and then a verbal feedback, then judge B can give a feedback score and followed by a verbal feedback, and so forth. For yet another example, presenter B and his associated time slots (T8-T12) can be moved to a time before those of presenter A so presenter B can perform first.

The master application can be used to set different durations of time, or the exact duration for each of the T1-T18. Time durations can be set from the event creation screen 400 (FIG. 4), such as the length of the entire event and the length of each sub-event. Time durations can also be set from another part of the user interface of the master application, such as a time duration for each judge to submit his scores, a time duration for each judge to give feedback, a time duration for a break between two judges' feedback, a time duration for a break between two presenters' presentations, and other time durations. The total time duration set through the master application should be equal to or less than the length of the event.

FIG. 5 also illustrates a timer 505 implemented by the master application that is configured to operate with the algorithm (or the time duration setting functionality and the event). After the user of the master application inputs the time durations, the duration information is sent to the timer and the timer can be set from zero second duration to a time duration entered in the master application. The timer can also initiate a countdown (e.g., from the entered duration such as 2 minutes to 0 seconds) under the instruction of the master application, which can be generated by the user selecting a play command in the master application. The countdown resolution is in seconds. The timer by default may have no time duration or zero second duration. The timer can be set to each entered time duration and initiate a countdown for each. The countdown can be paused under the instruction of the master application, which can be generated by the user selecting a pause command in the master application. The timer and its countdown progress can be displayed on a screen of the master application and be shared with the slave application through the network.

For example, when the event involves three presenters and three judges, the event flows or the algorithms operate sequentially as follow:

1.) time duration 1 for presenter A to present (e.g., 5 minutes);
2.) time duration 2 for participants to submit feedback (e.g., 2 minutes);
3.) time duration 3 for judges to submit their feedback score (e.g., 3 seconds);
4.) time duration 4 for judge A to give verbal feedback (e.g., 2 minutes);
5.) time duration 5 for judge B to give verbal feedback (e.g., 2 minutes);
6.) time duration 6 for judge C to give verbal feedback (e.g., 2 minutes);
7.) time duration 7 for presenter B to present (e.g., 5 minutes);
8.) time duration 8 for participants to submit feedback (e.g., 2 minutes);
9.) time duration 9 for judges to submit their feedback score (e.g., 3 seconds);
10.) time duration 10 for judge A to give verbal feedback (e.g., 2 minutes);
11.) time duration 11 for judge B to give verbal feedback (e.g., 2 minutes);
12.) time duration 12 for judge C to give verbal feedback (e.g., 2 minutes);
13.) time duration 13 for presenter C to present (e.g., 5 minutes);
14.) time duration 14 for participants to submit feedback (e.g., 2 minutes);
15.) time duration 15 for judges to submit their feedback score (e.g., 3 seconds);
16.) time duration 16 for judge A to give verbal feedback (e.g., 2 minutes);
17.) time duration 17 for judge B to give verbal feedback (e.g., 2 minutes);
18.) time duration 18 for judge C to give verbal feedback (e.g., 2 minutes);

Steps 7-12 and 13-18 are repeats of steps 1-6 for the other presenters. The above steps can also be understood from FIG. 5. The event may be configured to flow in such a manner and this is the procedure through which participants follow to formulate and issue feedback to all the presenters.

The procedure is structured to have the immediacy of giving participants the opportunity to enter feedback and then immediately after it to see and hear the judge's score and feedback so that participants can think about and assess the feedback that participants gave in comparison. The event can progress through each step automatically, manually by the user selecting a command or next command to move to the next step, by a combination thereof. The master application can also automatically initiate countdown (without user intervention), can be manually initiated by the user selecting the play command, by a combination thereof (e.g., countdown of one duration is initiated automatically by the master application and countdown of another duration is initiated manually by the user through the master application). The user can press the pause command at any time to halt the countdown. Additional time durations can be inserted if necessary, such as in between any of the aforementioned steps (e.g., there are additional judges, need a break in between the steps, etc.) or additional time durations after step 18 (e.g., if there are additional presenters).

The timer can also keep track, or the master application can implement another timer to keep track, how far the event has progressed in time, such as there are 40 minutes remaining in the event. The master application can also implement one or more timers for setting and counting down the durations in steps 1-18.

The timer allows people to stay on time and ensure that the event finishes in allocated time.

Figure 6:
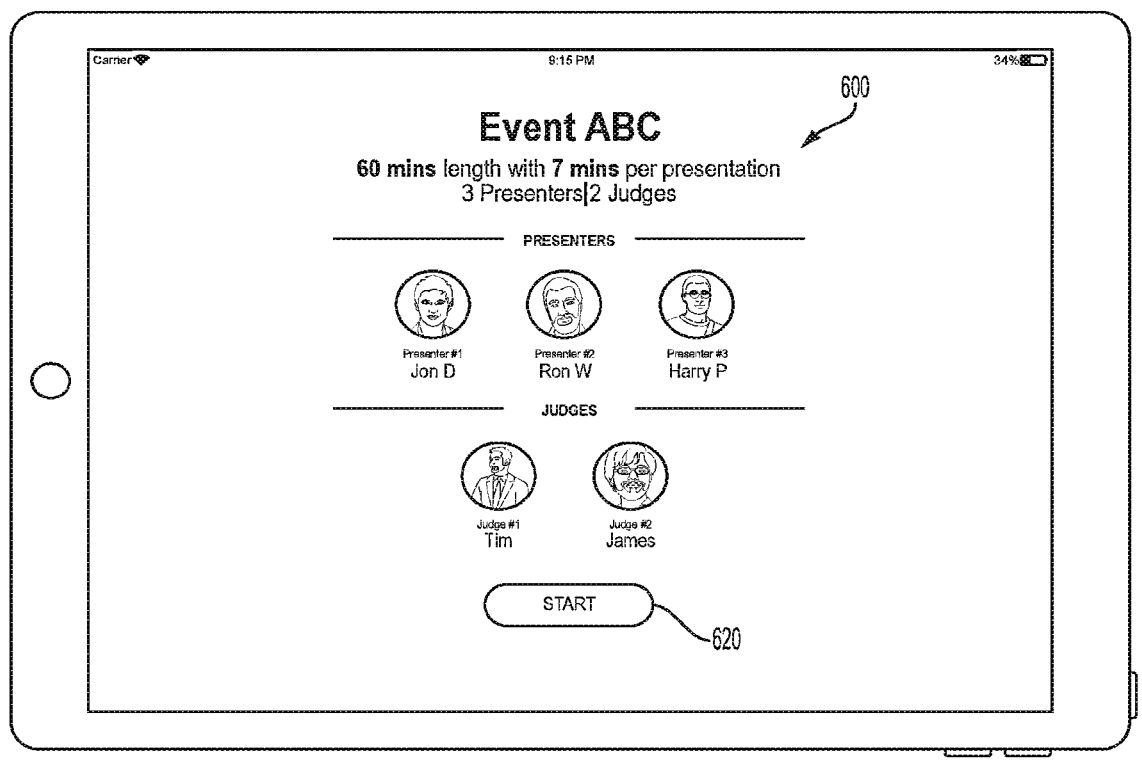
FIG. 6 illustrates an initial screen of the slave application showing a summary of the event created by the master application in accordance with some embodiments of the present invention.
Figures 7A, 7B, 7C:
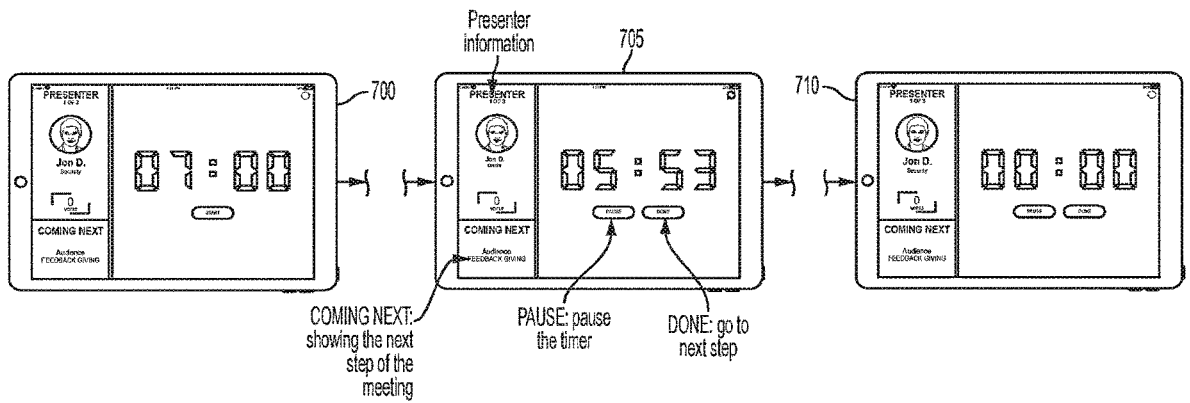
FIGS. 7A-7C illustrate presenter screens of the slave application showing a presentation duration and a countdown in accordance with some embodiments of the present invention.

The master application is a master in that it is the application that is used to create events and control the progress of the event. The user of the master application can control the progress of the event such as by initiating a countdown of a time duration or moving to the next time duration or next sub-event (e.g., starting a presentation by selecting a play command, advancing to the next stage by clicking a next command). The slave application is a slave in that it is used to receive event information, event progress information, and master application user operation information and to convey that information. For example, the summary of an event shown in FIG. 6 is obtained from the master application. For example, the slave application transitions from FIG. 7 to FIG. 8 after the user of the master application selects a start command 620 or an equivalent command from the master application. This operation or selection is detected by the slave application through the network and the slave application operates accordingly. In other words, execution of the algorithm by the master application is communicated to the slave application. The slave application is a passive application in that it cannot be separately controlled or be controlled through its own application.

Preferably, the slave application is an application that is incapable of creating events or incapable of controlling the progress of the event (e.g., no commands are available to the user of the slave application for selection). However, in some embodiments, the slave application may be configured to have such capabilities but such capabilities are only available to the user of the slave application when the master application fails to operate properly or under certain conditions.

A cloud computing platform such as Amazon Web Services (AWS) may be used as part of the cognitive skill development system to facilitate the communication between the master application and the slave application. For example, the master application may be configured to constantly communicate event information, event progress information, and master application user operation to the AWS and the slave application may be configured to constantly communicate with the AWS to obtain that information such as, for example, every second. Variations are contemplated.

Description will now be directed to the slave event software application (slave application). The slave application is configured to operate under the control of the master application and based on the event created in the master application. The slave application is also configured to operate and display graphical screens. The slave application and the master application are configured to communicate over the network. In one embodiment, the slave application and the master application are configured to communicate directly over the network (e.g., no server or other central system or service is involved in the communication). The slave application may be configured to constantly communicate or read data from the master application, such as every second.

In one embodiment, an event processing system or service is implemented on a cloud computing platform such as AWS that is configured to communicate with the master application, slave application, feedback application, and other applications, devices, and systems. For example, operations by the master application can be communicated to the event processing system and the information on the event processing system can be accessed by the slave application and feedback application allowing the slave application and feedback application to perform its operation. For instance, when the user of the master application selects a play command on the master application to initiate a countdown, that selection is transmitted to the event processing system. The slave application is configured to constantly communicate with the event processing system and, upon detecting the selection from the event processing system, the selection and countdown process are also displayed on the slave application in real time. For another example, the master application and the slave application may provide the user interface that are configured to receive the necessary information and the actual operation is performed by the event processing system. The event processing system then instructs the corresponding device to perform in real time. Other combinations and variations are contemplated.

The slave application is the application that is used to show the event or progress of the event (e.g., how many minutes into the event, who is presenting, who is giving feedback, etc.) to the participants, judges, presenters, and other individuals. The master application controls the flow of the event and its operations and screens may not be presented or displayed to the participants, judges, presenters, and other individuals. FIGS. 6-12 illustrate part of the user interface of the slave application and operations of the slave application.

FIG. 6 illustrates an initial screen 600 of the slave application showing a summary of the event created by the master application. At the starting time of the event, the master application may automatically load the event or load the event after the user of the master application selects the corresponding event command in the master application. After loading the event, the slave application obtains the event information from the master application (or AWS) through its communication with the master application (or AWS). After obtaining that information, the slave application displays screen 600 with the obtained information, such as the name of the event, the entire event length (e.g., 60 minutes), the sub-event length (e.g., 7 minutes), the number of presenters, and the number of judges. The event (or the algorithm of the master application) may start after the user of the master application selects a command (e.g., start command) on the master application to begin the event. The master application then transitions to the presentation by the first presenter and the presentation can be started after the user of the master application initiates the presentation or countdown by selecting a start command (T1 in FIG. 5).

The slave application communicates with the master application to obtain this information and displays screen 700 (before selecting the start command) and 705 (after selecting the start command), respectively. The slave application reaches screen 710 when the timer reaches zero. The transition from screen 700 to screen 705 and then to screen 710 is based on information detected constantly from the master application, or detected in real time. The slave application can also show who is presenting, the number of feedback/votes he has received from the participants, and the next stage or sub-event of the event. The master application may include a pause command configured to pause the timer and a done command configured to end the timer and enter the next stage. If the user selects the pause command, then the timer is paused and the slave application also shows that the timer is paused because its constant communication with the master application. If the user selects the done command, then the timer is ended or set to zero and the slave application also shows that the timer is ended or set to zero. For example, the master application sends the current time on the timer every second or every X time to the event processing system and this is sent along with meeting status information such as who is currently presenting or which judge is currently giving feedback. The slave application then reads that time and other information and updates its display of the event for its users and participants in the event. This constant communication idea for obtaining information from the master application also applies to FIGS. 8-11. As such, the operation of the master application in FIGS. 8-11 will not be discussed for the sake of brevity and only the operation of the slave application will be discussed.

Figure 8:
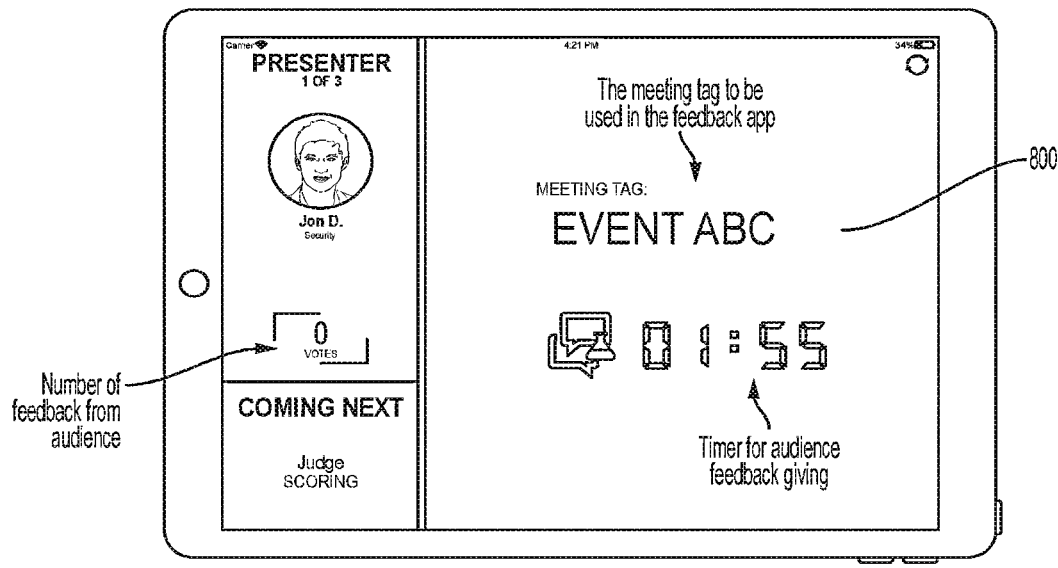
FIG. 8 illustrates participant feedback giving screen of the slave application in accordance with some embodiments of the present invention.

The slave application then transitions to FIG. 8, which illustrates a participant feedback giving screen 800, or a stage where the participants are provided an opportunity or a time duration to give feedback for the presentation. A timer or a countdown is also shown. A meeting tag Event ABC is also provided so the participants can look for the correct event in the feedback software application to submit feedback.

Figure 9A:
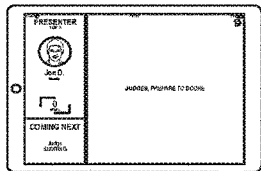
FIGS. 9A-9D illustrate judge-feedback-score giving screens of the slave application in accordance with some embodiments of the present invention.
Figure 9B:
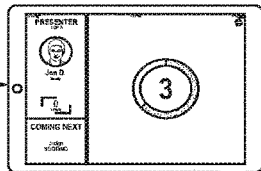
Figure 9C:
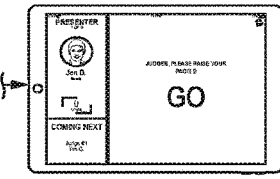
Figure 9D:
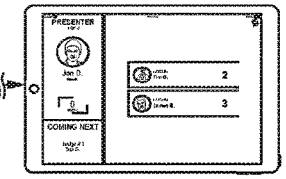
Figure 10A:
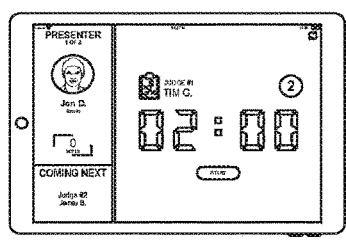
FIGS. 10A-10C illustrate judge-verbal-feedback giving screens of the slave application in accordance with some embodiments of the present invention.
Figure 10B:
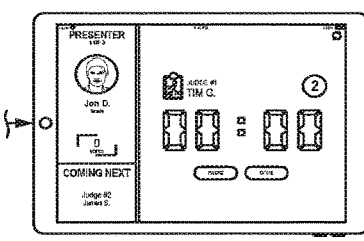
Figure 10C:
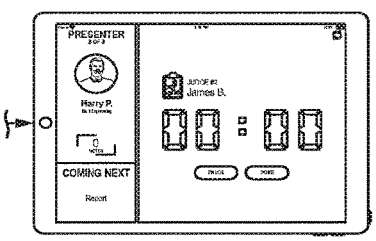

The slave application then transitions to FIGS. 9A-9D, which illustrate judge feedback score giving screens, or a stage where the judges are provided an opportunity or a time duration to give a feedback score for the presentation. FIGS. 9A-9C show how much time the judges have to give their feedback scores. The master application may include a user interface through which judges' feedback scores can be entered by the user of the master application and communicated to the slave application (through the constant communication). In some embodiments, the system 100 may provide another software application that can be installed on judge's mobile devices and be used by a judge to enter his feedback scores, without relying by the master application or the user of the master application. That application can then transmit the entered score to the event processing system or the master application over the network. The slave application then transitions to FIGS. 10A-10C, which illustrate judge verbal feedback giving screens, or a stage where the judges are provided an opportunity or a time duration to give a verbal feedback for the presentation. FIGS. 10A-10C show how much time the judges have to give their verbal feedback and when the timer reaches zero seconds, which means his time is up. FIGS. 10A-10B are directed to the screens for the first judge. There are similar screens for the second judge and FIG. 10C shows when the time for the second judge is up.

The slave application then repeats the operations in FIGS. 7-10 for other presenters until the event is completed (because the way the event is set up in the master application).

Figure 11:
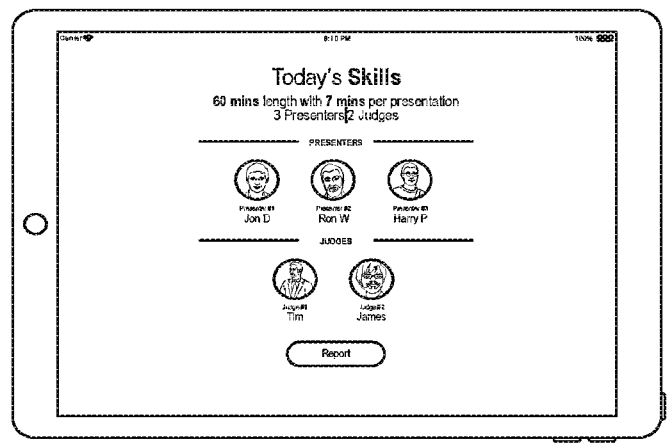
FIG. 11 illustrates a conclusion screen of the slave application that includes a report command that is configured to generate or show feedback results upon selection in accordance with some embodiments of the present invention.

At the conclusion of the event, the slave application transitions to FIG. 11, which illustrates a conclusion screen which is similar to the initial screen except that the conclusion screen includes a report command that is configured to generate or show feedback results upon selection.

Figure 12:
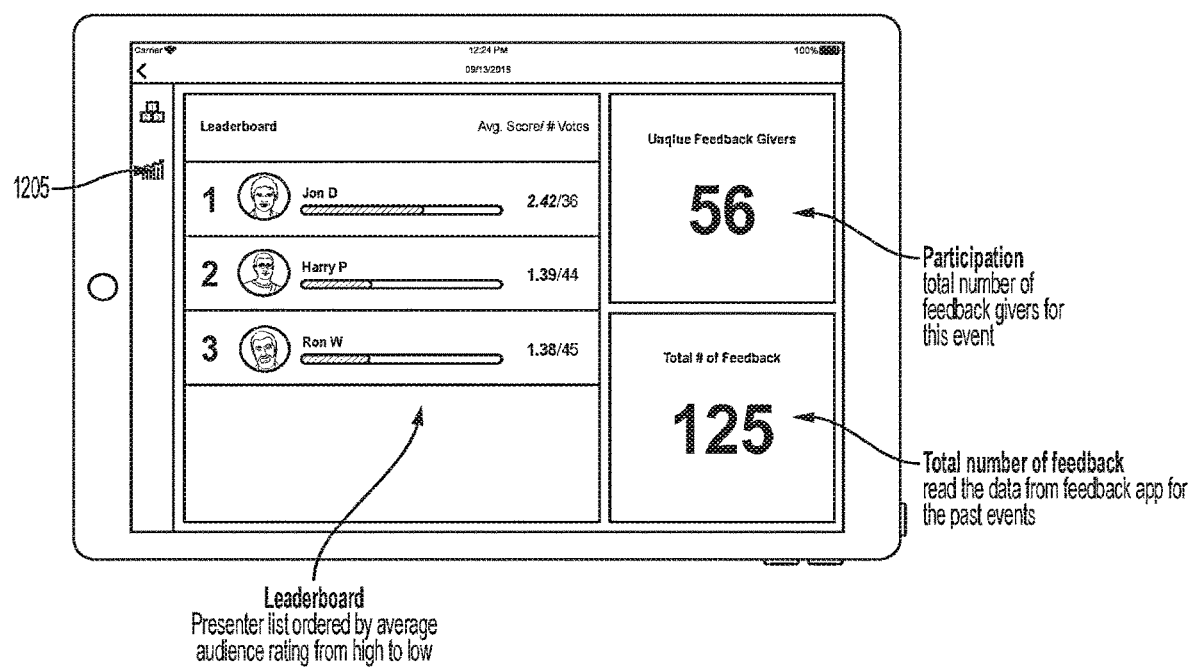
FIG. 12 illustrates a basic feedback result screen of the slave application in accordance with some embodiments of the present invention.
Figure 13:
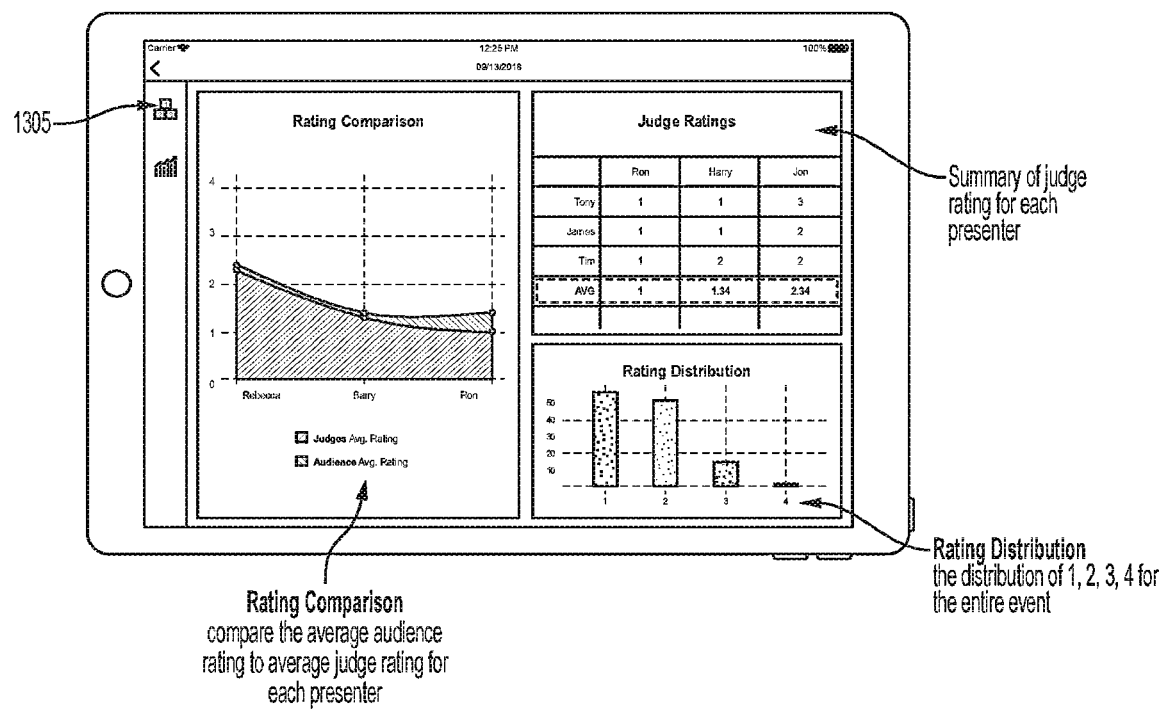
FIG. 13 illustrates an advanced feedback result screen of the slave application in accordance with some embodiments of the present invention.

After selecting the report command, the slave application transitions to FIG. 12, which illustrates a basic feedback result screen. The results are obtained by the report command sending a request to the feedback processing system (which may include the meeting tag and/or presenter identities tags) and the feedback processing system aggregating and analyzing the feedback using the meeting tag and/or presenter identities tags. The basic feedback result screen includes an advanced feedback result command 1205 that is selectable to open on an advanced feedback result screen shown in FIG. 13. The advanced feedback result screen includes a basic feedback result command 1305 which is selectable to return to the basic feedback result screen.

For example, the result may include an average numerical feedback rating for each presented, each judge's numerical feedback rating for each presenter, numerical feedback rating comparison between the participants and the judges, numerical feedback rating distribution, the total number of feedbacks each presenter has received, and the presenter with the highest average numerical feedback rating. The generated and presented results do not have participant identity information and can keep participants' identities anonymous.

The master application may include a next command, a start/play command, a pause command, a done command, or a combination thereof in order for the user of the master application to move to the next stage of the event or control the progress of the event, which may also be shown on the slave application as seen in FIGS. 7-11 because of their communication arrangement (but may not be used to move to the next stage of the event or control the progress of the event like the master application). The master application and the slave application may also similarly include and display a report command, a basic result screen command, and an advanced result screen command.

For example, in response to the user of the master application selecting the next button for an event to move to a stage where a presenter is to speak, the salve application can remove or clear an existing display screen that was showing information about the next presenter on the event and displays a (small) timer on the screen that shows the time duration for that presenter. Subsequently, in response to the user of the master application selecting the play button, the timer displayed on the master application can start or show the countdown. When the timer ends, the display of the salve application can be updated to display on the screen the next stage (sub-event) that is on the event.

The timer displayed on the slave application or any other device that is viewing the master application display screen or information for that event is based on obtaining the time information from the master application (timer of the master application) independent of any local time capabilities of the slave application or other device. The timer that is displayed would then track the time (display the time) that is on the master application, or that the master application has sent to the event processing system or AWS, which is obtained by the other device.

The system may include an audio system based on text-to-speech technology that is configured to speak texts (e.g., name of the presenter, allotted time for presentation and feedback giving, how much time is remaining, what feedback score each judge gave, etc.). The audio system is accessible by the master application or the slave application to provide the appropriate audio at the right time. This voice moderation helps facilitate the entire event and makes it easy for audience to know what action to do when.

Figure 14:
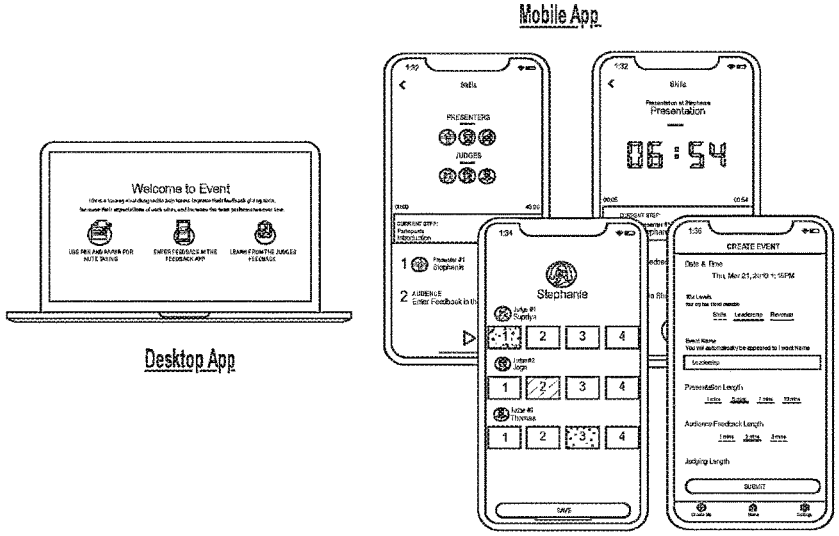
FIG. 14 illustrates a system including the master and slave applications in accordance with some embodiments of the present invention.
Figure 15:
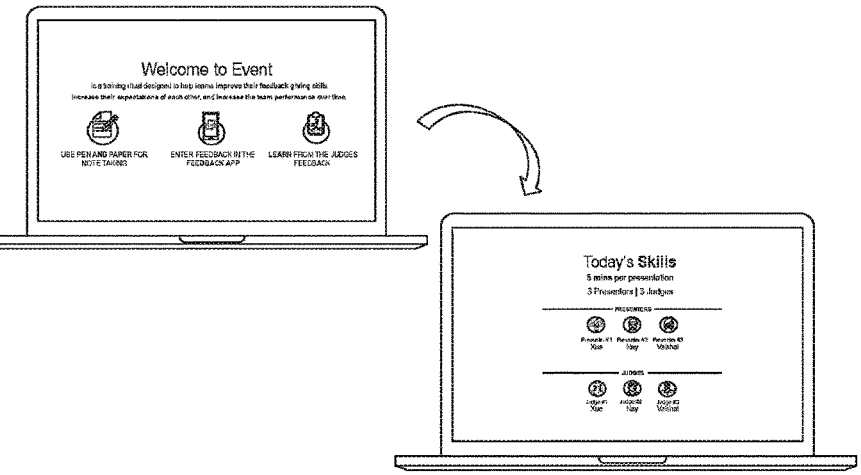
FIG. 15 illustrates an operation of the master and slave applications shown in FIG. 14 in accordance with some embodiments of the present invention.
Figure 16:
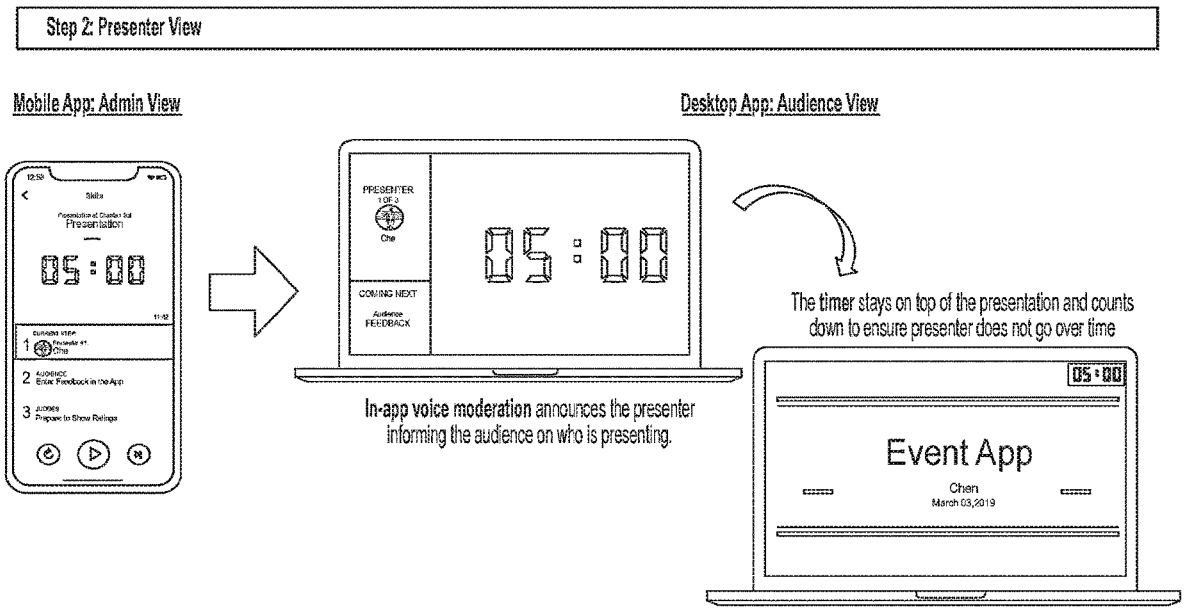
FIG. 16 illustrates another operation of the master and slave applications shown in FIG. 14 in accordance with some embodiments of the present invention.
Figure 17:
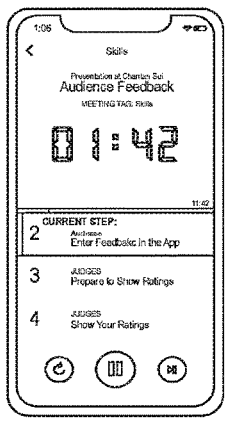
FIG. 17 illustrates another operation of the master and slave applications shown in FIG. 14 in accordance with some embodiments of the present invention.
Figure 17:
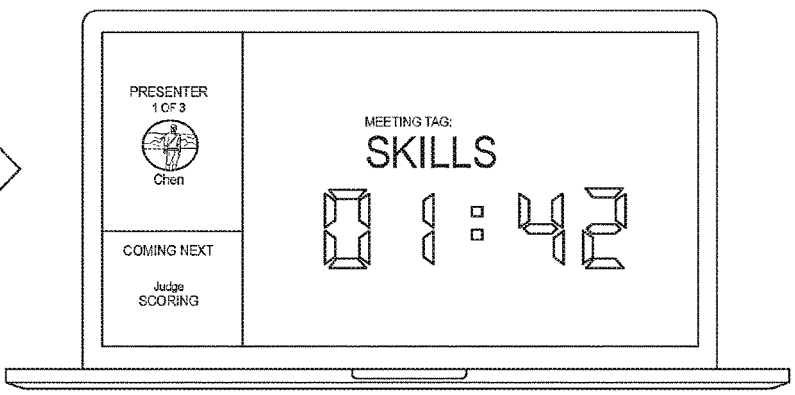
Figure 18:
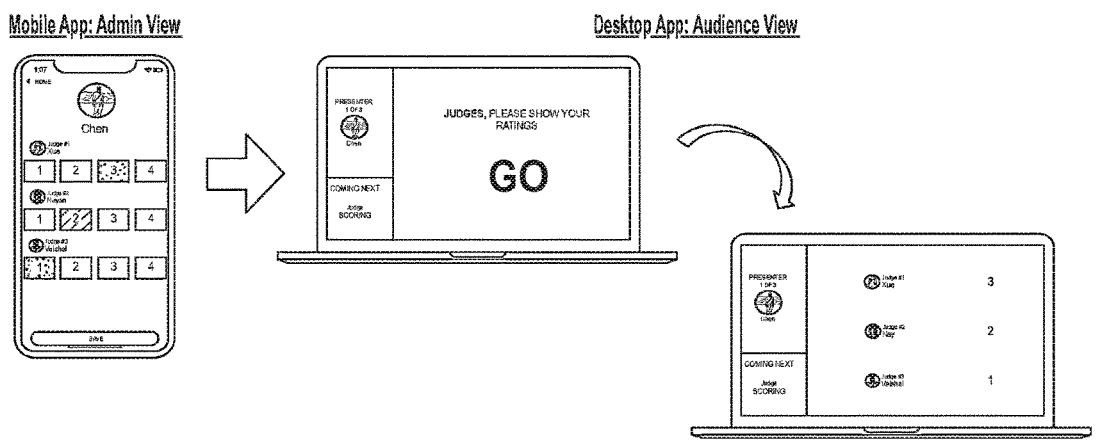
FIG. 18 illustrates another operation of the master and slave applications shown in FIG. 14 in accordance with some embodiments of the present invention.
Figure 19:
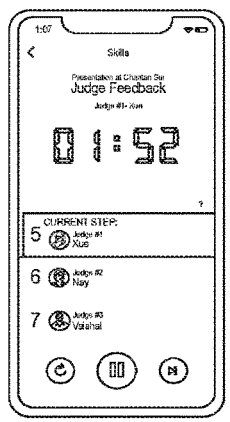
FIG. 19 illustrates another operation of the master and slave applications shown in FIG. 14 in accordance with some embodiments of the present invention.
Figure 19:
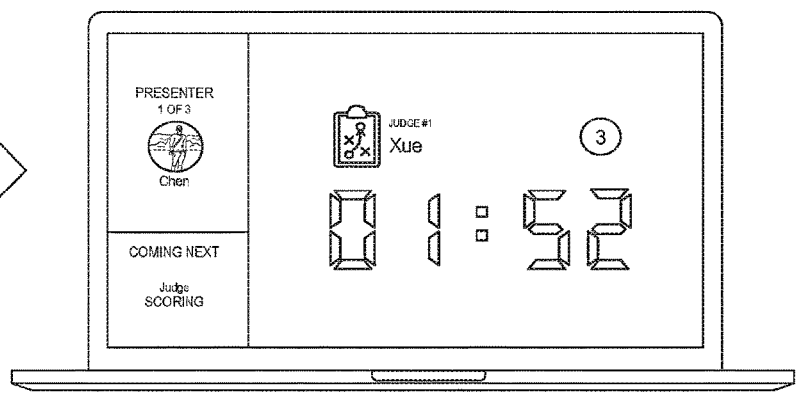

FIG. 14 illustrates a system including the master and slave applications. FIGS. 15-19 illustrate operations of the master and slave applications shown in FIG. 14. The mobile app refers to the master application and the desktop application refers to the slave application. Their operations are understood from their figures and the present disclosure.

The master and slave applications are applications that may be used in conjunction with a video conferencing system or software application, WebEx. In some embodiments, the master and slave applications may be built into or include a video conferencing service or functionality. The master and slave applications and the feedback application are two different and distinct application or services, and relatedly, they have different supporting infrastructure, including databases that support their architecture. In other words, the described system 100 is an independent system. By separating the system, the system allows the company to use web conference, use any type of web conference it wants, use multiple different conferencing tools at the same time, or not to use web conference. This separation can allow each system (the described system and the web conferencing system) to work more efficiently and can avoid the need to have understand controls for web conferencing for running the meeting. This separation can also separate the person running the meeting (moderator), making this person distinct from the person who is controlling or running the video conference. The integration of the described system 100 into the web conferencing system is contemplated and variations of such integration are also contemplated.

The anonymous feedback giver identity data in the feedback application or feedback processing system is not available to the master and slave applications. The master and slave applications and the feedback application can communicate with each other to obtain data such as information about an upcoming event and display that information about an upcoming event in the feedback application such as by using a meeting notification or other popup or notification in the mobile app. The feedback processing system would be configured to restrict and segregate feedback about individuals (e.g., feedback messages and feedback giver's identity) from being available to the master and slave applications. The event processing system can pull data from the feedback application (e.g., feedback message) and the mater application (e.g., judge's numerical rating) and combine judges' numeral scores with the participants' numerical scores.

The event is preferably a live event that the participants, presenters, judges, and other individuals attend together at the same time (see FIG. 2). Using the electronic event facilitating system provides features and assurances that are not possible manually. Participants can enter feedback during the event "live," which is anonymous and not traceable to that use. In a manual implementation (such as paper), there would be a risk or concern that that the feedback or information would be seen or associated with the individual by the moderator (user of the master application), those involved in moderating the event, or peer participants.

The application discusses a master application and a slave application. In variations, the two applications can be a "one" software application that exists in and is running across multiple devices such as a master device and a slave device and as part of this can cause the master and slave applications to function as described. The master application is configured to a have an event format that is repeatedly used for the exercise. This way, the user of the master application does not have to make many selection or configuration decisions.

The master and slave applications can be used, implemented, or configured for purposes other than facilitating events. The master and slave applications can also be standalone that are configured to primarily or dedicated to create, schedule, and run an event or meeting of a particular type (other than presentation or feedback-related events).

The procedure described in this application can be implemented once a week or at another frequency to repetitively train employees' feedback giving skills.

An electronic device may be a desktop computer, laptop computer, a tablet computer, a cellular device, a mobile device, a smartphone, a personal digital assistant (PDA), or other computer system having a microprocessor and memory. Although FIGS. 3-4, 6-13 appear to show that the master and slave applications are installed on an iPad, it is understood that the iPad is used for illustration purposes only, and the master and slave applications may also be installed on other electronic devices such as desktop computer, laptop computer, a tablet computer, a cellular device, a mobile device, a smartphone, a personal digital assistant (PDA), or other computer system having a microprocessor and memory.

An electronic device or a server includes a microprocessor and memory (transitory storage), non-transitory storage, display, network interface configured to communicate with a communications network, I/O circuitry, and other electronic components. An electronic device including a combination thereof is also contemplated. For example, an electronic device or a server includes a processor and non-transitory memory that stores computer executable instructions, wherein the instructions, when executed by the processor, configures the processor to perform operations specified by the instructions.

A server may have larger memory and larger storage capacity than those of an electronic device and has the capability of sustaining concurrent data communication with multiple end users or client devices. An electronic device may be a client device. In FIGS. 1 and 2, devices 105, 110, 115 may be client devices and the feedback processing system 120 and the event processing system may be implemented on a server (on the same server or separate servers).

Timer is an electronic clock used for setting and measuring time intervals. Timer can count downwards or upwards. Timer can be software or hardware timer.

The communications network can include Internet, a cellular network, a telephone network, a computer network, a packet switching network, a line switching network, a global area network, a local area network (LAN), a wide area network (WAN), or any number of private networks currently referred to as an intranet, and/or any other network or combination of networks that can accommodate data communication. Preferably, the communication network is the internet. Such networks may be implemented with any number of hardware and software components, transmission media, and network protocols. Although FIG. 1 represents the network as a single network, the network can include multiple interconnected networks listed above.

In some embodiments, the master and slave application and/or the feedback application are connected to the event processing system, the feedback processing system, or the server through WiFi, cellular network, and/or the internet to provide functionality and work with their supporting servers. The master and slave application and/or the feedback application do not, for example, use the company's local enterprise network to communicate with a company server.

Commands may include windows, fields, icons, buttons, and the like that allow the user to enter, select, or otherwise provide information to a software application. The user may utilize commands to enter information through peripheral devices such as a keyboard, mouse, monitor, touch-screen, and the like.web Participant feedback may include a feedback message and a numerical feedback score (e.g., 1, 2, 3, and 4). Judges feedback may include a numerical feedback score (e.g., 1, 2, 3, and 4) and a verbal feedback.

User of the master application or first electronic device can be referred to as an administrator or moderator, or an event administrator or event moderator. Access to the master application (e.g., administrator access) may be provided on team basis, such as given to team leaders only.

It is understood from the above description that the functionality and features of the systems, devices, or methods of embodiments of the present invention include generating and sending signals to accomplish the actions.

It should be understood that variations, clarifications, or modifications are contemplated. Applications of the technology to other fields are also contemplated.

Exemplary systems, devices, and methods are described for illustrative purposes. Further, since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention.

Thus, for example, any sequence(s) and/or temporal order of steps of various processes or methods (or sequence of device connections or operation) that are described herein are illustrative and should not be interpreted as being restrictive. Accordingly, it should be understood that although steps of various processes or methods or connections or sequence of operations may be shown and described as being in a sequence or temporal order, but they are not necessarily limited to being carried out in any particular sequence or order. For example, the steps in such processes or methods generally may be carried out in various different sequences and orders, while still falling within the scope of the present invention. Moreover, in some discussions, it would be evident to those of ordinary skill in the art that a subsequent action, process, or feature is in response to an earlier action, process, or feature.

It is also implicit and understood that the applications or systems illustratively described herein provide computer-implemented functionality that automatically performs a process or process steps unless the description explicitly describes user intervention or manual operation.

It should be understood that claims that include fewer limitations, broader claims, such as claims without requiring a certain feature or process step in the appended claim or in the specification, clarifications to the claim elements, different combinations, and alternative implementations based on the specification, or different uses, are also contemplated by the embodiments of the present invention.

It should be understood that combinations of described features or steps are contemplated even if they are not described directly together or not in the same context.

The terms or words that are used herein are directed to those of ordinary skill in the art in this field of technology and the meaning of those terms or words will be understood from terminology used in that field or can be reasonably interpreted based on the plain English meaning of the words in conjunction with knowledge in this field of technology. This includes an understanding of implicit features that for example may involve multiple possibilities, but to a person of ordinary skill in the art a reasonable or primary understanding or meaning is understood.

Software application can be implemented as distinct modules or can be integrated together into an overall application such as one that includes the user interface and that handles other features for providing the functionality to the user on his device.

It is intended that the specification and examples be considered as exemplary only, with a true scope being indicated by the claims and their equivalents.

The invention claimed is:

1. A method for operating an event with an online conferencing component, comprising:
    receiving, by a feedback processing system, a user input selecting an event from a plurality of scheduled events which each have an online conferencing component provided by a web conferencing service;
    enabling, by the feedback processing system, an electronic feedback message composing function and a numerical rating selection function for a duration of time determined based on a duration setting of a timer;
    performing, by the feedback processing system, the electronic feedback message composing function to compose an electronic feedback message for a presenter at the selected event, responsive to a user-software interaction by an individual attending the selected event; and
    performing, by the feedback processing system, the numerical rating selection function to select a numerical rating for the presenter responsive to another user-software interaction by the individual attending the selected event.

2. The method according to claim 1, further comprising automatedly controlling operations of at least one electronic device to integrate the electronic feedback message or numerical rating in a graphical user interface along with feedback information input by another individual attending the selected event.

3. The method according to claim 1, wherein the feedback processing system comprises a feedback submission device in the possession of a participant of the selected event.

4. The method according to claim 3, further comprising processing the electronic feedback message to anonymize an identity of the participant of the selected event.

5. The method according to claim 4, wherein the electronic feedback message composing function and the numerical rating selection function are enabled during an occurrence of the selected event.

6. The method according to claim 5, wherein the participant is participating in the selected event in person.

7. The method according to claim 5, wherein the participant is participating in the selected event virtually via the online conferencing component provided by the web conferencing service.

8. The method according to claim 1, further comprising receiving, from an event facilitating system, information about an upcoming event which has been scheduled.

9. The method according to claim 8, further comprising creating, by the feedback processing system, a meeting tag in response to reception of the information about the upcoming event.

10. The method according to claim 9, further comprising using, by the feedback processing system, the meeting tag to configure a display screen to facilitate the user input selecting the event from the plurality of scheduled events.

11. The method according to claim 8, wherein the event facilitating system and a part of the feedback processing system are disposed in a room in which one or more participants is located.

12. The method according to claim 1, wherein the feedback processing system comprises a datastore in which identities of employees within an enterprise are stored and a software application that can access the datastore to obtain identities of employees that can be selected by a user via a graphical user interface of the feedback processing system or an event facilitating system.

13. A system, comprising:
a processor; and
a non-transitory computer-readable storage medium comprising programming instructions that are configured to cause the processor to implement a method for operating a system, wherein the programming instructions comprise instructions to:
receive a user input selecting an event from a plurality of scheduled events which each have an online conferencing component provided by a web conferencing service;
enable an electronic feedback message composing function and a numerical rating selection function for a duration of time determined based on a duration setting of a timer;
perform the electronic feedback message composing function to compose an electronic feedback message for a presenter at the selected event, responsive to a user-software interaction by an individual attending the selected event; and
perform the numerical rating selection function to select a numerical rating for the presenter responsive to another user-software interaction by the individual attending the selected event.

14. The system according to claim 13, wherein the programming instructions further comprise instructions to automatedly control operations of at least one electronic device to integrate the electronic feedback message or numerical rating in a graphical user interface along with feedback information input by another individual attending the selected event.

15. The system according to claim 13, wherein the system comprises a feedback submission device in the possession of a participant of the selected event.

16. The system according to claim 13, wherein the programming instructions further comprise instructions to process the electronic feedback message to anonymize an identity of the participant of the selected event.

17. The system according to claim 16, wherein the electronic feedback message composing function and the numerical rating selection function are enabled during an occurrence of the selected event.

18. The system according to claim 17, wherein the participant is participating in the selected event in person or virtually via the online conferencing component provided by the web conferencing service.

19. The system according to claim 13, wherein the programming instructions comprise instructions to:
receive, from an event facilitating system, information about an upcoming event which has been scheduled;
create a meeting tag in response to reception of the information about the upcoming event; and
use the meeting tag to configure a display screen to facilitate the user input selecting the event from the plurality of scheduled events.

20. The system according to claim 19, wherein the event facilitating system and a part of the system are disposed in a room in which one or more participants is located.

* * * * *